United States Patent
Kato et al.

(10) Patent No.: US 6,818,827 B2
(45) Date of Patent: Nov. 16, 2004

(54) DEVICE FOR ABSORBING HARNESS SLACK

(75) Inventors: Mitsunobu Kato, Shizuoka (JP); Makoto Sunohara, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/315,241

(22) Filed: Dec. 10, 2002

(65) Prior Publication Data

US 2003/0121692 A1 Jul. 3, 2003

(30) Foreign Application Priority Data

Dec. 11, 2001 (JP) ........................................ 2001-377082

(51) Int. Cl.[7] .............................. H01B 7/06; H02G 3/02
(52) U.S. Cl. .................... 174/72 A; 174/135; 191/22 R; 191/23 R; 296/155
(58) Field of Search .............................. 174/68.1, 68.3, 174/69, 72 A, 97–99 R, 135, 136; 191/22 R, 23 R; 248/629; 296/149, 152, 155

(56) References Cited

U.S. PATENT DOCUMENTS

| 6,321,489 | B1 | * | 11/2001 | Murofushi et al. | ........... 49/360 |
| 6,390,535 | B1 | * | 5/2002 | Chapman | .................... 296/155 |
| 6,481,783 | B1 | * | 11/2002 | Rogers et al. | .............. 296/155 |
| 6,515,229 | B2 | * | 2/2003 | Aoki et al. | ................ 174/72 A |
| 6,517,365 | B1 | * | 2/2003 | Bungo et al. | ............... 296/155 |
| 6,566,603 | B2 | * | 5/2003 | Doshita et al. | ........... 174/72 A |
| 6,570,093 | B2 | * | 5/2003 | Doshita et al. | ........... 174/72 A |
| 6,575,760 | B2 | * | 6/2003 | Doshita et al. | ........... 174/72 A |

* cited by examiner

Primary Examiner—Anthony Dinkins
Assistant Examiner—Adolfo Nino
(74) Attorney, Agent, or Firm—Armstrong, Kratz, Quintos, Hanson & Brooks, LLP

(57) ABSTRACT

A device for absorbing harness slack is disclosed wherein a leaf spring (resilient member) 37 is provided with a harness-guide member 34 which supports a curved portion 33 of a wire harness 32 slidably. The harness-guide member 34 has an upper surface (harness-support member) 38 curved throughout its length toward the curved portion 33. Alternatively, the leaf spring 37 may be provided with the curved harness-guide member 34 rotatably through a coupling member 36. Also alternatively, a protector protecting the curved portion 33 of the wire harness 32 may be provided with the curved harness-guide member 34 rotatably, and the leaf spring 37 may urge the harness-guide member 34 through such as a cap in a direction of absorbing harness slack slidably. Also alternatively, the upper surface 38 may compose a groove curved in a circumferential direction of the wire harness.

9 Claims, 6 Drawing Sheets

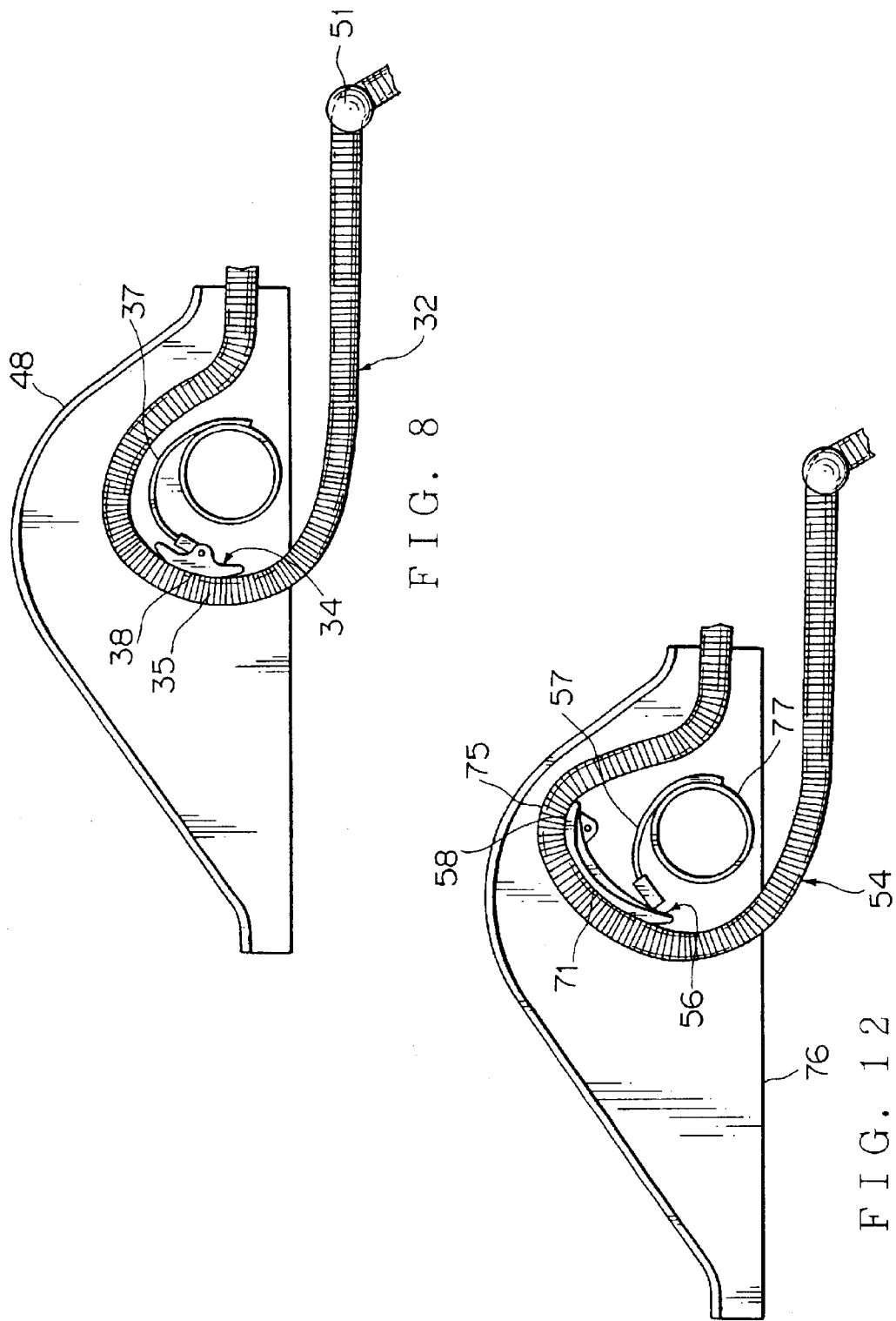

DEVICE FOR ABSORBING HARNESS SLACK

BACKGROUND OF THE INVENTION

1. Field of the Invention

The present invention relates to a device for absorbing harness slack to prevent slack in wire harness associated with opening or closing of a door for the purpose of continuously supplying such as a sliding door of vehicles with electricity.

2. Description of the Related Art

In vehicles such as minivans or wagons, it is necessary to supply a sliding door with electricity continuously regardless of whether said sliding door is open or closed so as to employ such as electrical components or accessories therein, or an automatic open/close actuator for said sliding door in a vehicle body.

For this purpose, a wire harness made of plurality of electric wires is arranged from a vehicle body into a sliding door, supplying with electricity or distributing electric signals. It is necessary that the wire harness inside the sliding door should be expanded or contracted according to open/close condition of the sliding door and absorb the wire harness slack so as not to being caught in a gap between the sliding door and the vehicle body by the slack when closing the sliding door.

For this purpose, a device for absorbing harness slack is proposed as shown in FIG. 13. In this device for absorbing harness slack 80, substantially a semi-circular shaped protector 81 made of synthetic resin accommodates a wire harness 82 in a curved shape and a metal leaf spring 84 urges a curved portion 83 of the wire harness 82 in a direction of upholding the wire harness 82. A cap (guiding member) 85 made of synthetic resin is fixed on an end part of the metal leaf spring 84, supporting the wire harness 82 without any damage.

The wire harness 82 is expanded when the sliding door is closed, while the wire harness 82 is contracted to be curved in a small radius inside the semi-circular shaped protector 81 when the sliding door is open. The metal leaf spring 84 prevents the wire harness 82 from dropping down especially at the time of opening the sliding door by means of upholding the wire harness 82 without any slack. The cap 85 is formed thicker than the metal leaf spring 84, so that the cap 85 resolves confliction between the wire harness 82 and the end part of the metal leaf spring 84, preventing the wire harness 82 from being damaged.

However, in the conventional device for absorbing harness slack 80 as above described, since the end part of the cap 85 abuts against the wire harness 82, the curved portion 83 of the wire harness 82 tends to be supported at one point. In this case, as shown in FIG. 14, there is a worry that the wire harness 82 may be folded (86) to make it difficult for the wire harness 82 to shift slidably on the cap 85. In the event of the wire harness 82 being folded, an angle of the curve cannot be guaranteed, and the expansion or contraction of the wire harness 82 and the slack absorbing of the wire harness 82 will not take places smoothly at opening or closing the door and so forth. Further, some folding remains in the wire harness 82, generating a trouble that electric wires composing the wire harness 82 tend to be broken due to repetition of curving the electric wires.

SUMMARY OF THE INVENTION

The present invention has been accomplished to solve the above-described problems and an object of the present invention is to provide a device for absorbing harness slack which is able to prevent the wire harness from folding due to the cap (guiding member) abutting against the wire harness, so that the expansion or contraction of the wire harness and the slack absorbing of the wire harness take places smoothly and surely at opening or closing the door and so forth.

In order to attain the above described object, there is provided, according to a first aspect of the present invention, a device for absorbing harness slack comprising a resilient member and a harness-guide member mounted on the resilient member, the harness-guide member supporting a curved portion of a wire harness slidably, wherein the harness-guide member comprises a harness-support surface curved throughout its length in a direction of the curved portion.

With this configuration, for example, when a diameter of the curved portion of the wire harness is expanded or contracted by the expansion or contraction of the wire harness according to opening or closing the door, the harness-support surface of the harness-guide member continuously ensures the degree of curving of the wire harness, allowing the curved portion to shift smoothly and slidably without any folding.

Therefore, this configuration prevents any curl from remaining in the wire harness, allowing the wire harness to being expanded or contracted smoothly and surely, and preventing electric wires composing the wire harness from being broken or suffered with age.

There is provided, according to a second aspect of the present invention, a device for absorbing harness slack comprising a resilient member and a curved harness-guide member mounted rotatably on the resilient member, the harness-guide member supporting a curved portion of a wire harness slidably, whereby the harness-guide member is allowed to rotate in a curving direction of the wire harness.

With this configuration, the curved harness-guide member ensures a degree of curving of the wire harness, preventing the wire harness from folding when expanding or contracting. Moreover, the harness-guide member rotates according to the expansion or contraction of the diameter of the curved wire harness portion, keeping the degree of curving of the wire harness more surely.

Therefore this configuration allows the wire harness to being expanded or contracted smoothly and surely, preventing electric wires composing the wire harness from being broken or suffered with age.

There is provided, according to a third aspect of the present invention, the device for absorbing harness slack described above as the second aspect of the present invention, wherein a coupling member intervenes between the resilient member and the harness-guide member, and the harness-guide member is coupled rotatably with the coupling member.

With this configuration, the harness-guide member is fastened to the resilient member using the coupling member easily and surely. Moreover, the coupling member improves the rotatability of the harness-guide member.

According to the third aspect of the present invention, since the harness-guide member is fastened to the resilient member using the coupling member easily and surely, an assembling workability is improved. Moreover, the coupling member improves the rotatability of the harness-guide member to further promote an effect of the second aspect of the present invention.

There is provided, according to a fourth aspect of the present invention, a device for absorbing harness slack comprising a protector accommodating a wire harness in a curved shape, and a resilient member urging to absorb the harness slack, wherein a curved harness-guide member supporting the wire harness is mounted on the protector rotatably, and the resilient member urges the harness-guide member in a direction of absorbing harness slack.

With this configuration, while the curved harness-guide member ensures the degree of curving of the wire harness, the resilient member urges the harness-guide member in a direction of absorbing the slack according to the expansion or contraction of the diameter of the curved wire harness portion, and the harness-guide member rotates to absorb the wire harness slack corresponding surely to diameter fluctuation of the curved wire harness portion. Moreover, the harness-guide member mounted on the protector blocks excessive diameter contraction of the wire harness, preventing excessive bending of the resilient member.

According to the fourth aspect of the present invention, therefore, this configuration allows not only to prevent the wire harness from folding when expanding or contracting, but also to expand and contract the wire harness smoothly and surely, preventing electric wires composing the wire harness from being broken or suffered with age. Moreover, since providing the resilient member and the harness-guide member separately eliminates a need of assembling with each other, an assembling workability is improved. Furthermore, since the harness-guide member mounted on the protector blocks the excessive diameter contraction of the wire harness and prevents excessive bending of the resilient member, this configuration prevents such as the wire harness from damaging when opening or closing a sliding door roughly and so forth, and eliminates a need of providing a harness bending regulator. Thus, a structure of the protector is simplified.

There is provided, according to a fifth aspect of the present invention, the device for absorbing harness slack described above as the fourth aspect of the present invention, wherein either an end part of the resilient member or a cap at the end part of the resilient member supports slidably the harness-guide member.

With this configuration, when expanding or contracting the diameter of the curved wire harness portion, the resilient member shifts slidably and smoothly along a bottom surface of the harness-guide member, so that expanding or contracting a diameter of the wire harness, namely, expanding or contracting of the wire harness takes place smoothly and surely.

According to the fifth aspect of the present invention, therefore, a slack absorbability of the harness is improved, while abrasion and abnormal noise between the resilient member and the guiding member are prevented.

There is provided, according to a sixth aspect of the present invention, the device for absorbing harness slack described above as any of the second to fifth aspects of the present invention, wherein the harness-guide member has a harness-support surface being curved in the direction of the curved portion throughout its length.

With this configuration, the curved harness-support surface is stuck to the curved wire harness portion, keeping the degree of curving of the wire harness surely, and preventing the curved wire harness portion from folding.

According to the sixth aspect of the present invention, therefore, both a slack absorbability and an expanding or contracting ability of the harness are improved.

There is provided, according to a seventh aspect of the present invention, the device for absorbing harness slack described above as the first or sixth aspect of the present invention, wherein the harness-support surface composes a groove curved in a circumferential direction of the wire harness.

With this configuration, the wire harness is engaged with the groove, being supported stably without any displacement radially.

According to the seventh aspect of the present invention, therefore, the expansion or contraction of the diameter of the curved wire harness portion takes place more smoothly and surly, while such as friction between the wire harness and an interior of the protector is prevented so that both abrasion and abnormal noise of the wire harness are prevented.

BRIEF DESCRIPTION OF THE DRAWINGS

FIG. 8 is a side view when a sliding door is open according to the second embodiment of the device for absorbing harness slack;

FIG. 12 is a side view when a sliding door is open according to the third embodiment of the device for absorbing harness slack;

DESCRIPTION OF THE PREFERRED EMBODIMENT

Figure 1:
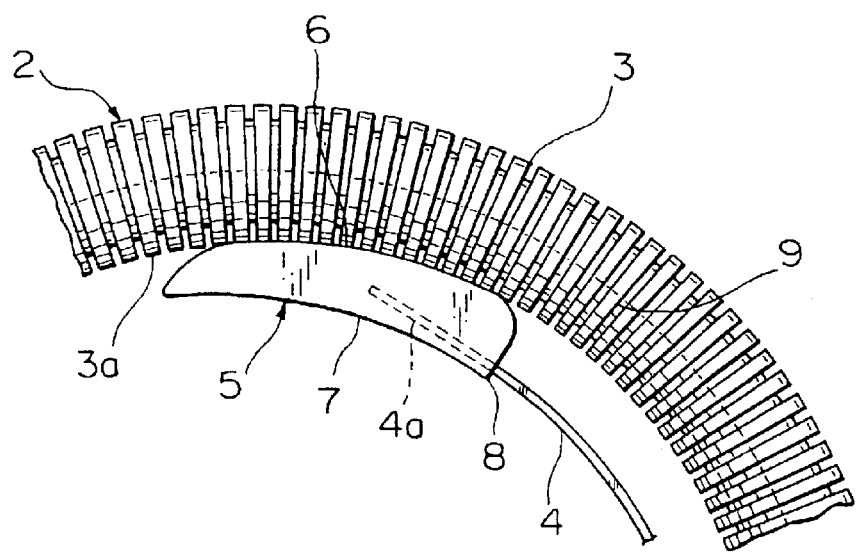
FIG. 1 is a side view showing a substantial part of a first embodiment of a device for absorbing harness slack according to the present invention.

Now, an embodiment according to the present invention will be described in detail referring to the drawings.

Figure 2:
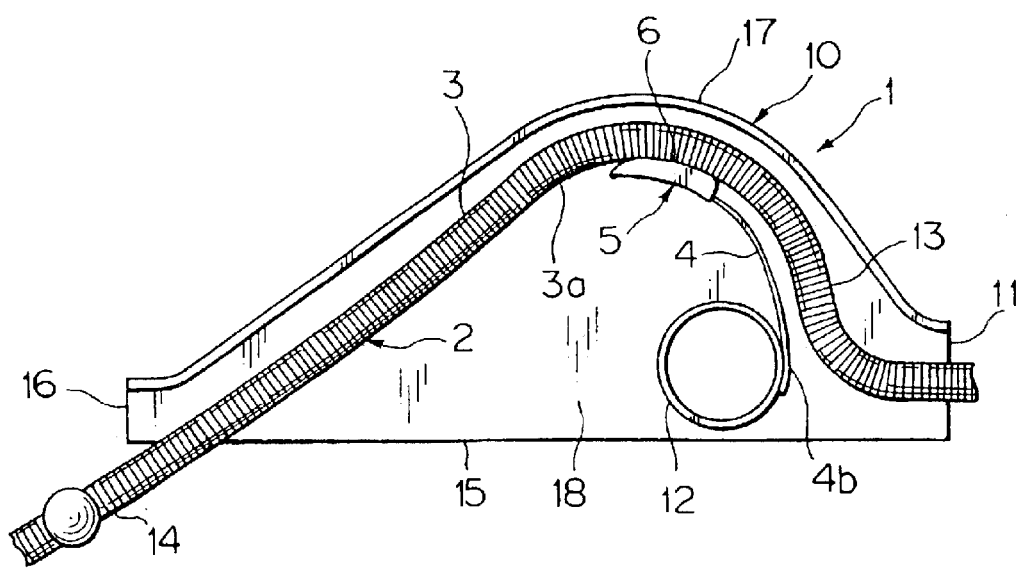
FIG. 2 is a side view when a sliding door is closed according to the first embodiment of the device for absorbing harness slack.
Figure 3:
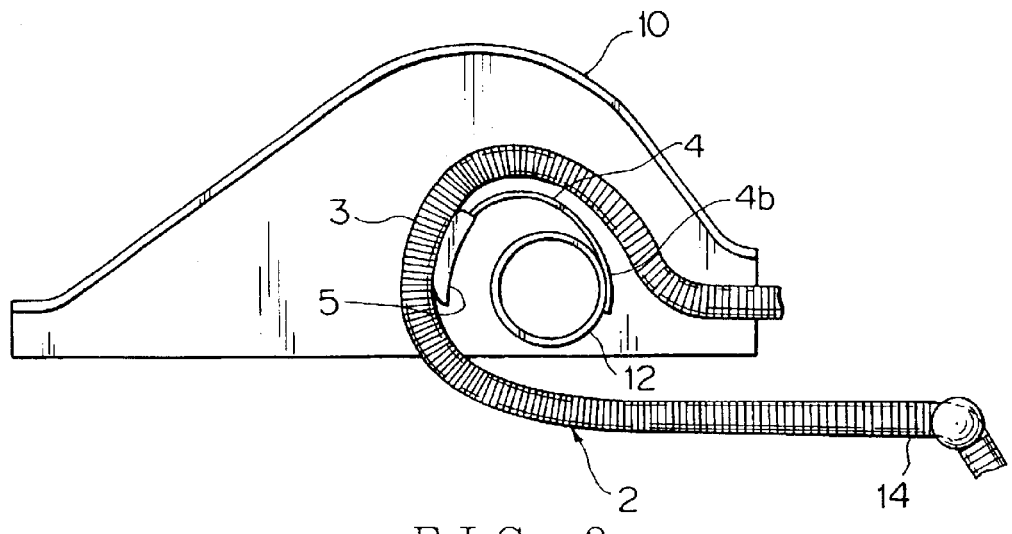
FIG. 3 is a side view when a sliding door is open according to the first embodiment of the device for absorbing harness slack.

FIGS. 1 to 3 show a first embodiment of a device for absorbing harness slack according to the present invention.

In this device for absorbing harness slack 1, as shown in FIG. 1, a curved cap (harness-guide member) 5 is fixed on an end part of a leaf spring (resilient member) 4 urging a curved portion of a wire harness 2 in the direction of upholding the wire harness.

The cap 5 is made of synthetic resin, having an upper surface (harness-support surface) 6 being curved in the direction of the curved portion throughout its length and an under surface 7. The upper surface 6 abuts on a bottom side surface 3a of the curbed portion 3 of the wire harness 2. An end part 4a of the leaf spring 4 is inserted into a socket 8 of the cap 5. The wire harness 2 is covered with an accordion-shaped Colgate tube 9.

As shown in FIG. 2, the curbed portion 3 of the wire harness 2 is accommodated in substantially a semi-circular shaped protector 10. And an anchoring part 4b of the leaf spring 4 is fixed on a front side 11 of the protector 10. The protector 10 is provided with a loop shaped bending regulatory wall 12 in an inside of the bending direction of the leaf spring 4. The protector 10 is composed of a body and a cover (not shown). The wire harness 2 is accommodated in the protector 10 with the cover open and mounted on the upper surface 6 of the cap 5 at the end part 4a of the leaf spring 4. The wire harness 2 is curved smoothly without any folding along a curved shape of the cap 5. The body and cover of the protector 10 have an curved upper peripheral wall 17 and a vertical side wall 18. The bending regulatory wall 12 is formed protruding from the side wall 18. The anchoring part 4b of the leaf spring 4 is fixed on or around the bending regulatory wall 12. The peripheral wall 17 regulates a maximum diameter of the curbed portion 3 of the wire harness 2.

The protector 10 is disposed between an outer panel and a door trim of the sliding door. One side (front side) 13 of the wire harness 2 is connected to electrical components, accessories and so forth, and an other side (rear side) 14 of the wire harness 2 is drawn from an opening 15 of the bottom of the protector 10, being extended to a vehicle body. The front side 11 of the protector 10 and a front side of the vehicle are in same direction, while a rear side 16 of the protector 10 and a rear side of the vehicle are in same direction.

When closing the sliding door from a condition shown in FIG. 2, the wire harness 2 is pulled backward and the curbed portion 3 is elongated. On this occasion, the leaf spring 4 urges upward the wire harness 2 with bending downward. The cap 5 smoothly and slidably shifts along the bottom side surface 3a of the wire harness 2, ensuring the degree of curving of the wire harness 2 on the curved upper surface 6 of the cap 5. Therefore, the wire harness 2 is prevented from folding and the elongation operation of the wire harness 2 smoothly takes place.

Then, when opening the sliding door, the wire harness 2 is accommodated in the protector 10 as shown in FIG. 2 with a curved and formerly elongated shape, being urged by the leaf spring 4. On this occasion also, with ensuring the degree of curving of the wire harness 2 along the curved shape of the cap 5, the bottom side surface 3a of the wire harness 2 smoothly slidably shifts along the curved shape of the cap 5 without any catch. Therefore, the wire harness 2 is prevented from folding and the slack absorbing of the wire harness 2 smoothly takes place.

When the sliding door is fully open, as shown in FIG. 3, the other side (extended to the vehicle body) 14 is pulled forward and the curbed portion 3 is contracted to a small diameter shape. On this occasion, the leaf spring 4 is bent against an urging force to be a small diameter shape. The wire harness 2 is bent smoothly without any folding, with ensuring the degree of curving along the curved shape of the cap 5. Therefore, both the contracting of the diameter of the curved portion and the slack absorbing of the wire harness 2 are take places smoothly and surely.

When closing the sliding door as shown in FIG. 2 from the full open condition shown in FIG. 3 also, the wire harness 2 slidably shifts with ensuring the degree of curving thereof along the curved shape of the cap 5 without any catch, with the diameter of the curved portion of the wire harness 2 being expanded. With these functions, the wire harness 2 is prevented from folding and there is no need to worry about any deformation or fracture of respective electric wires composing the wire harness 2.

In FIG. 2, mostly the cap 5 supports the wire harness 2, while the leaf spring 4 does not abut on the wire harness 2 much. In FIG. 3, the cap 5 and the anchoring part 4b of the leaf spring 4 abut on the wire harness 2, while the end part of the leaf spring 4 does not abut on the wire harness 2 much. Therefore, the degree of curving of the wire harness 2 depends on the curved shape of the cap 5 so that the curved shape of the cap 5 is very important. Preferably, a radius of the curved shape of the cap 5 is designed according to a radius of the curved portion of the wire harness 2 when contracted in FIG. 3. When opening the sliding door roughly, the curved portion of the wire harness 2 is more contracted than that in FIG. 3, abutting against the bending regulatory wall 12, being prevented from bending further.

Figure 4A:
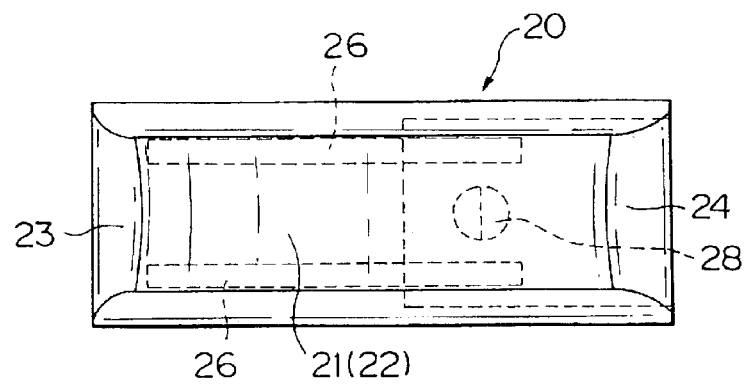
FIG. 4A is a side view showing a first embodiment of a harness-guide member.
Figure 4B:
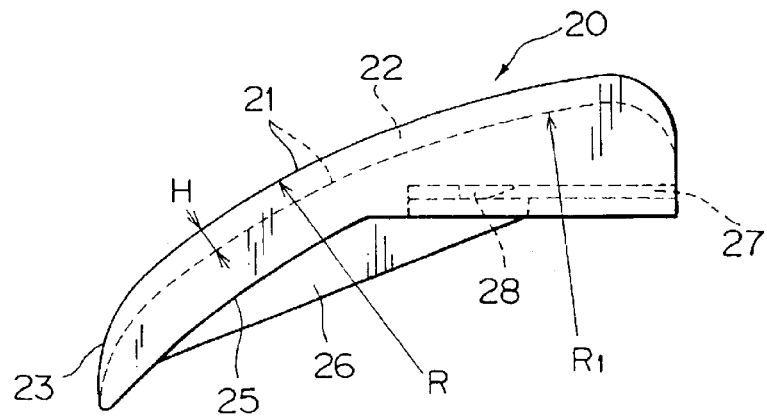
FIG. 4B is a plan view of the harness-guide member.

FIG. 4A and FIG. 4B show one detailed embodiment of a cap (harness-guide member). An upper surface (harness-support member) 21 of the cap 20 composes a groove part 22. The groove part 22 is curved in a longitudinal direction and in a transverse direction respectively. A depth H of the groove part 22 is shallow, such as 3 mm, while a radius R of curving in a longitudinal direction of the groove part 22 is, for example, 30R(300 mm). The bottom side surface 3a of the wire harness 2 (FIG. 1) is mounted within the groove part 22 stably, preventing the displacement of the wire harness 2. Since the wire harness 2 is disposed and caught between both a right and a left wall 18 of the protector 10 (FIG. 2), the wire harness 2 may not slip and fall off from the cap 5, 20.

The upper surface (harness-support surface) 21 of the cap 20 has non-symmetric front and rear parts, being curved like a banana. A radius R1 of curving of an anchoring part 24 is a little bit smaller. An end part 23 of the cap 20 is curved downward like a bird's beak with a small radius of curving, being prevented from catching the wire harness 2 with a end part thereof.

A bottom surface 25 of the cap 20A is provided with a pair of reinforcing ribs 26, preventing damage caused by folding toward the dogleg-shaped bottom surface 25. The cap is provided with a socket 27 for inserting the leaf spring through from the anchoring part to a middle of the longitudinal part of the cap 20. A locking projection 28 corresponding to a locking hole (not shown) of the end part of the leaf spring is mounted inside the socket 27. The leaf spring 4 (FIG. 1) is locked and fixed with one-touch operation at a moment of being inserted into the socket 27.

Moreover, not only synthetic resin but also other materials such as aluminum or other light metals, ceramics or other smooth-faced materials can be used in making the cap 5, 20. Further, the Colgate tube 9 shown in FIG. 1 is exchangeable for other flexible tubes. These above described are applicable to other embodiments described below.

FIGS. 5 to 8 show a second embodiment of the device for absorbing harness slack according to the present invention.

In this device for absorbing harness slack 31, a curved harness-guide member 34 along a curved portion 33 of a wire harness 32 is coupled rotatably with a coupling member 36 through a hinge part 35, and the coupling member 36 is fixed on an end part of a leaf spring (resilient member) 37. A large difference between this embodiment and the first embodiment is that the harness-guide member 34 can rotate in a bending direction of the wire harness 32.

Figure 5:
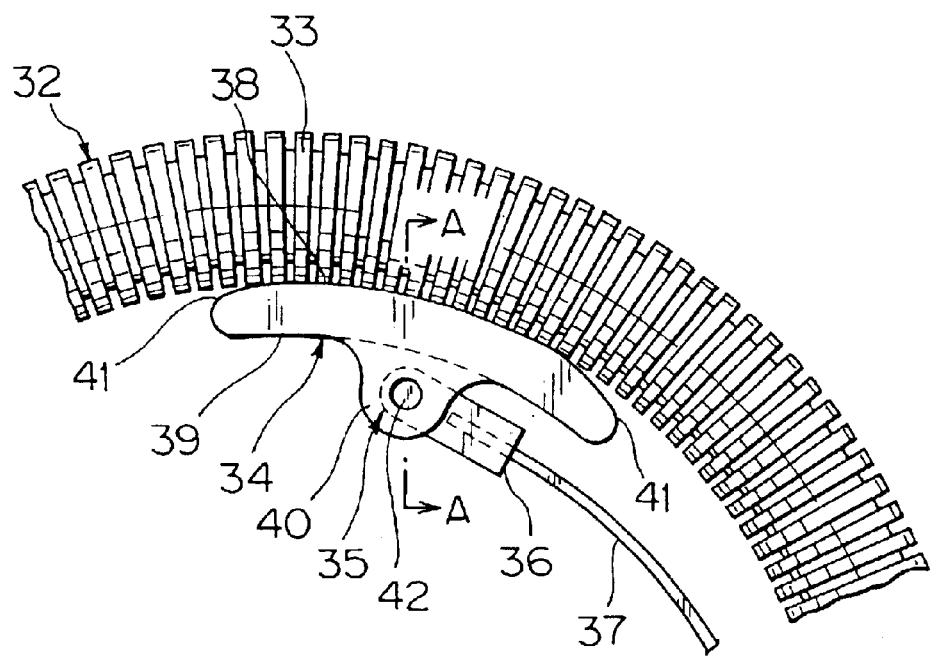
FIG. 5 is a side view showing a substantial part of a second embodiment of the device for absorbing harness slack according to the present invention.

As shown in FIG. 5, the harness-guide member 34 is made of such as synthetic resin, comprising integrally an upper surface (harness-support surface) 38 with an arc shaped curve in a longitudinal direction, a bottom surface 39 curved along the upper surface 38, and a pair of supporting pieces 40 (FIG. 6A and FIG. 6B) projecting downward from both left and right side thereof in about middle of the longitudinal direction thereof. The guiding member 34 is formed with approximately symmetric front and rear end parts. Both front and rear end parts 41 of the harness-guide member 34 are formed with a small curving radius so as to prevent from being caught by the wire harness 32. The coupling member 36 is coupled with the pair of supporting pieces 40 rotatably.

Figure 6A:
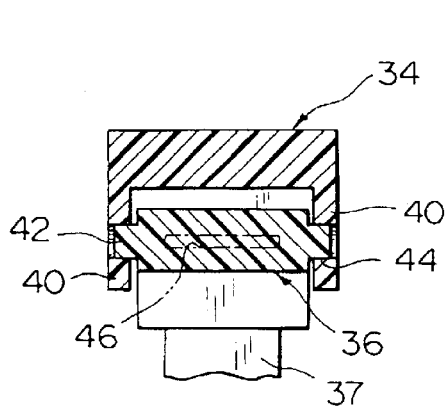
FIG. 6A is a cross-sectional view taken on line A—A of FIG. 5 showing one embodiment of a coupling structure of a guiding member.
Figure 6B:
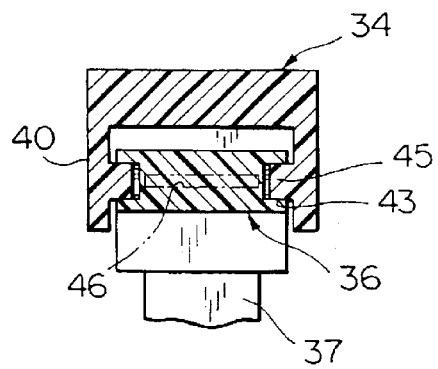
FIG. 6B is a cross-sectional view taken on line A—A of FIG. 5 showing the other embodiment of the coupling structure of the guiding member.

The coupling member 36 is made of such as synthetic resin, formed thicker than the leaf spring 37 with substantially rectangle shape, comprising axis parts 42 (FIG. 6A) or hole parts 43 (FIG. 6B) integrally in both sides of the end part. Each of FIG. 6A and FIG. 6B is a cross-sectional view taken on line A—A of FIG. 5. In a case using the axis parts 42 shown in FIG. 6A, the pair of supporting pieces 40 are provided with hole parts 44 for engaging with the axis parts 42, while in a case using the hole parts 43 shown in FIG. 6B, the pair of supporting pieces 40 are provided with inward-projecting axis parts 45. The pair of supporting pieces 40 can be curved out side, so that the axis parts 42 (45) are engaged with the hole parts 44 (43) by opening the pair of supporting pieces 40. The axis parts 42 (45) and the hole parts 44 (43) compose the hinge part 35 (FIG. 5). The socket 46 is disposed at an anchoring part of the coupling member 36, where an end part of the leaf spring 37 is inserted and locked.

Further, a shape of the harness-guide member 34 may have non-symmetric front and rear parts such as in the embodiment described above shown in FIG. 4A and FIG. 4B. Furthermore, the axis parts 42, 45 may be made separately of metal and may be mounted penetrating the harness-guide member 34 in a width direction of the coupling member 36. Further, it is also applicable that the leaf spring 37 made of metal, glass-fiber or so forth may be provided with axis parts or hole parts integrally in no use of the coupling member 36. Still further, the bottom surface 39 of the harness-guide member 34 may have a straight shape, not a curved shape, and may provided with a pair of reinforcing ribs 26 such as in FIG. 4A and FIG. 4B. Further, the harness-guide member 34 may be provided with the curved groove part 22 such as in FIG. 4A and FIG. 4B.

As shown in FIG. 5, by means of the harness-guide member 34 being rotatable about the leaf spring 37, the harness-guide member 34 always abuts against the wire harness 32 regardless of a motion (displacement) of the leaf spring 37, ensuring the degree of curving of the wire harness 32. Therefore, even when the case an curving angle of the 37 differs from the curving angle of the wire harness 32, a curved shape of the wire harness 32 is constantly regulated by the upper surface (curving surface) 38 of the harness-guide member 34, preventing the wire harness 32 from folding.

Figure 7:
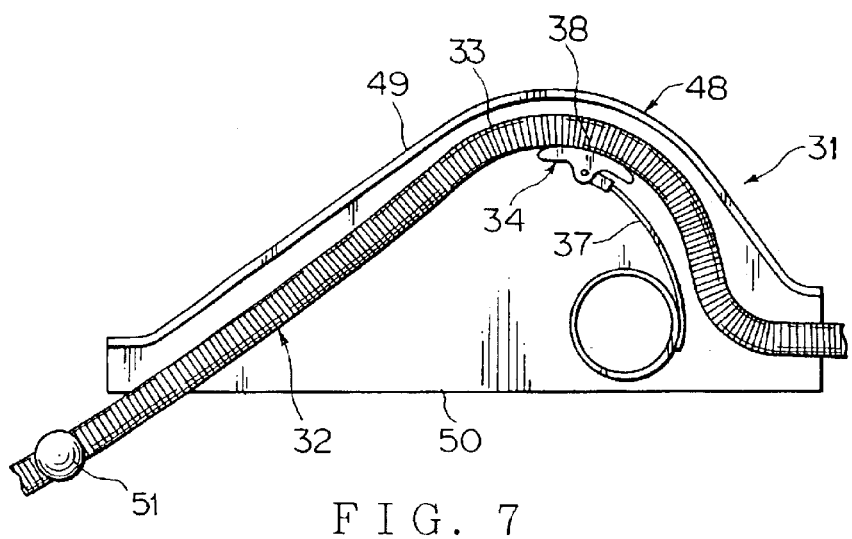
FIG. 7 is a side view when a sliding door is closed according to the second embodiment of the device for absorbing harness slack.

FIGS. 7 to 8 show a curving condition of the wire harness 32 associated with opening or closing of the sliding door. When closing the sliding door, as shown in FIG. 7, the wire harness 32 is upheld by the urging power of the leaf spring 37 with being curved along the peripheral wall 49, being kept curved shape thereof with abutting on the curved upper surface 38 of the harness-guide member 34. The harness-guide member 34 is disposed on a top of the curved portion 33 of the wire harness 32. The leaf spring 37 hardly abuts on the wire harness 32, while the harness-guide member 34 regulates the curved shape of the wire harness 32 correctly without folding of the wire harness 32. A configuration of the protector 48 is the same as the configuration in the first embodiment, so it is omitted here. The wire harness 32 drawn from a bottom opening 50 of the protector 48 is supported by a holding part 51 of the vehicle body.

When closing the sliding door shown as FIG. 8, the wire harness 32 is pulled toward the holding part 51, the diameter thereof being contracted in the protector 48. The leaf spring 37 is curved downward and the harness-guide member 34 rotates downward from its front with contacting slidably the wire harness 32, ensuring the degree of curving of the wire harness 32 correctly without any folding. By means of the harness-guide member 34 rotating using the hinge part 35 as a fulcrum according to the contracting of the diameter of harness-guide member 34, the wire harness 32 is curved smoothly and unforcedly, so the wire harness 32 may not suffer stress. Effects of the curved upper surface 38 of the harness-guide member 34 are the same as those in the first embodiment.

When closing the sliding door as shown in FIG. 7 from full opening as shown in FIG. 8, the harness-guide member 34 rotates upward from the front, reversed to the above described direction, so that the diameter of the curved portion of the wire harness 32 is expanded smoothly without any folding and catch. Thus, curving the wire harness 32 takes place more smoothly and correctly than that in the first embodiment.

FIGS. 9 to 12 show a third embodiment of the device for absorbing harness slack according to the present invention.

Figure 9:
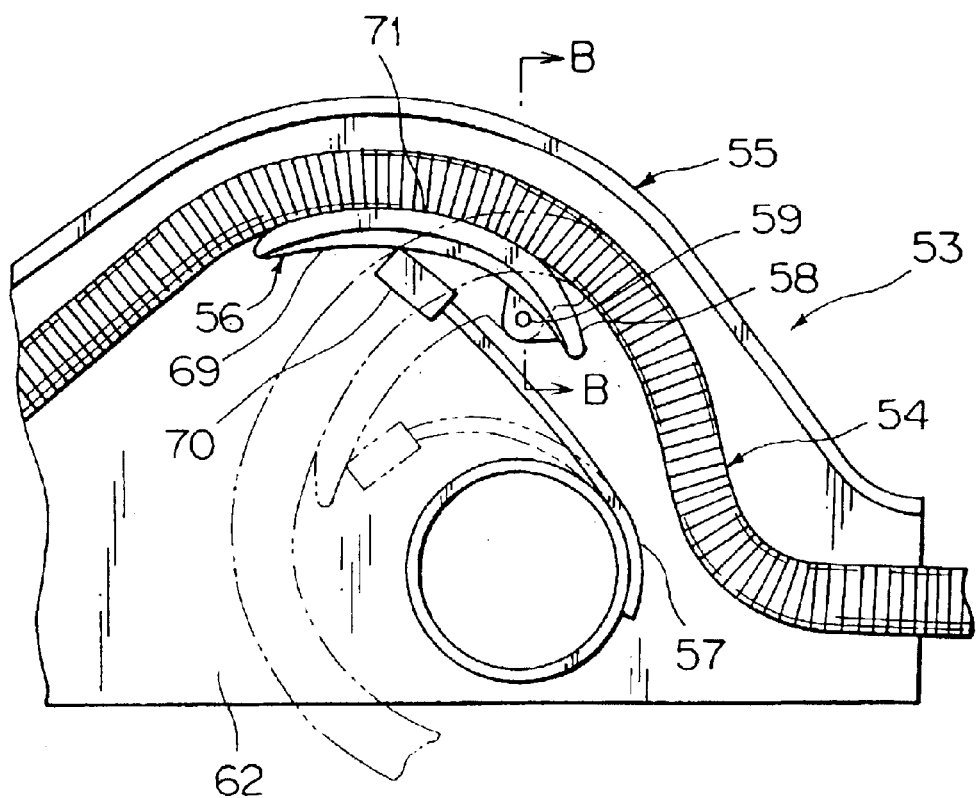
FIG. 9 is a side view showing a third embodiment of the device for absorbing harness slack according to the present invention.

In this device for absorbing harness slack 53, as shown in FIG. 9, a curve-shaped harness-guide member 56 supporting a wire harness 54 is mounted rotatably in a protector 55 accommodating the wire harness 54 in a curved shape, and a leaf spring (resilient member) 57 urges the harness-guide member 56 in the direction of upholding the harness-guide member 56.

Figure 10A:
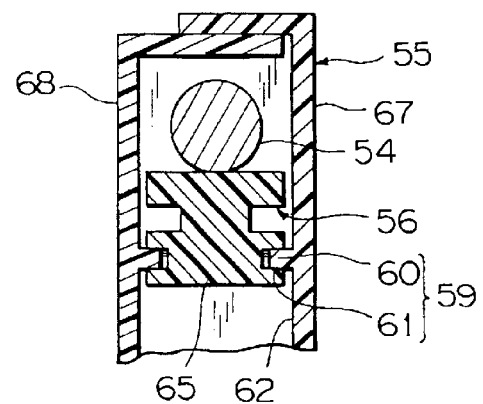
FIG. 10A is a cross-sectional view taken on line B—B of FIG. 9 showing one embodiment of a coupling structure of a guiding member.
Figure 10B:
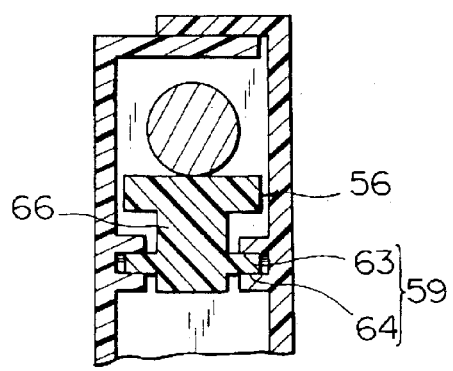
FIG. 10B is a cross-sectional view taken on line B—B of FIG. 9 showing the other embodiment of the coupling structure of the guiding member.

The harness-guide member 56 is made of synthetic resin, curved in a longitudinal direction with an arc shape or a banana shape such as the cap 20 shown in FIG. 4B supported rotatably at an anchoring part 58 by a hinge part 59. An axis part 60 composing the hinge part 59 is protruded from an inner wall 62 of the protector 55 made of synthetic resin, such as shown in FIG. 10A. Alternatively, as shown in FIG. 10B, an axis part 63 is mounted on the harness-guide member 56, engaging rotatably with a concave part 64 of the protector 55. The harness-guide member 56 includes a supporting boss 65 or a supporting piece 66. Hole parts 61 (FIG. 10A) is mounted on the supporting boss 65. An axis 63 (FIG. 10B) is mounted on the supporting piece 66 integrally or separately. The protector 55 is composed of a body 67 and a cover 68.

As shown in FIG. 9, the guiding member 56 and the leaf spring 57 are mounted separately, an end part of the leaf spring 57 or a cap-shaped supporting member 70 fixed on the end part of the leaf spring 57 shifting slidably on a curved bottom surface 69 of the harness-guide member 56.

Both the protector 55 and the leaf spring 57 themselves are almost the same as those in the first embodiment. The harness-guide member 56 is longer than that in the second embodiment.

The third embodiment is characterized by the harness-guide member 56 being mounted on the protector 55 rotatably and the harness-guide member 56 being supported by the leaf spring 57 slidably. The bottom surface 69 of the harness-guide member 56 has such a smooth curved shape as to allow the end part of the metallic leaf spring 57 or the cap-shaped supporting member 70 made of synthetic resin to shift slidably and smoothly.

Since the anchoring part 58 of the harness-guide member 56 is used as a fulcrum, the device for absorbing harness slack in the third embodiment surely keeps up with a variation of the diameter of curving of the wire harness 54. The leaf spring 57 keeps out of the wire harness 54 on a downside thereof completely, and a curved upper surface (harness-support surface) 71 of the harness-guide member 56 only abuts on the wire harness 54. As in the second embodiment, the curved upper surface 71 of the harness-guide member 56 constantly ensures the curved shape of the wire harness 54 without any folding. It is also adaptable that the groove part 22 shown in FIG. 4B is provided with the harness-guide member 56.

Figure 11:
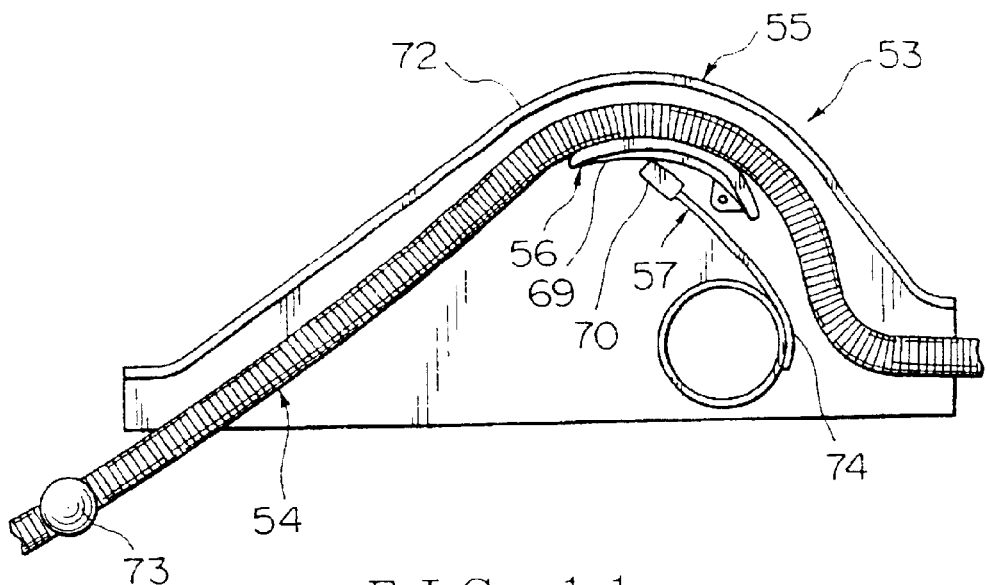
FIG. 11 is a side view when a sliding door is closed according to the third embodiment of the device for absorbing harness slack.
Figure 13:
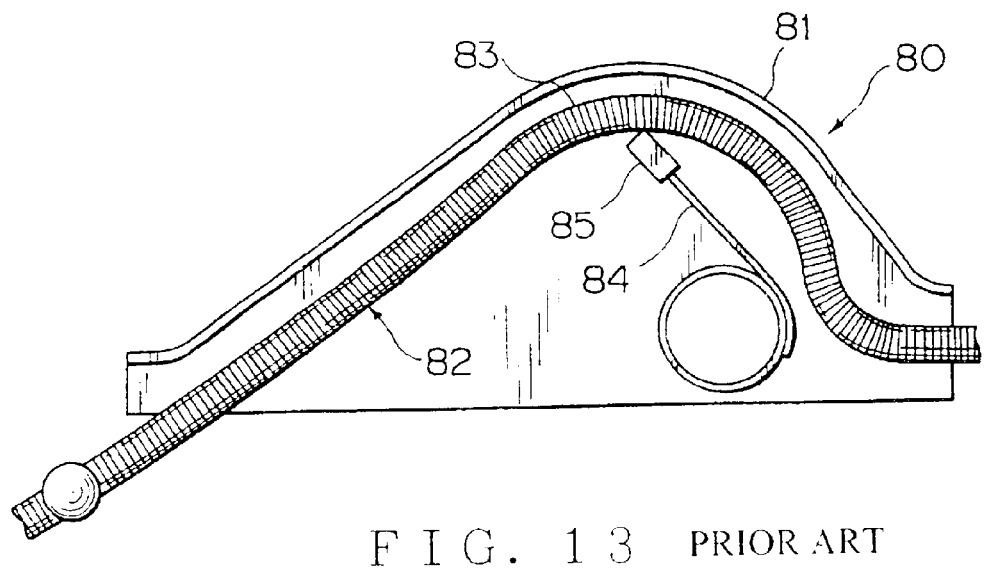
FIG. 13 is a side view showing one embodiment of a conventional device for absorbing harness slack.
Figure 14:
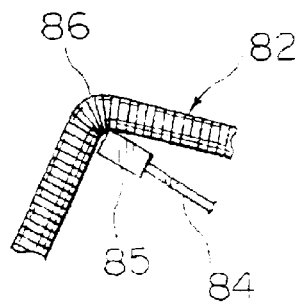
FIG. 14 is a side view showing a substantial part of a problem of the conventional device for absorbing harness slack.

As shown in FIG. 11, when the sliding door is closed, the leaf spring 57 urges the harness-guide member 56 horizontally or rather upwardly, while the cap 70 of the leaf spring 57 abuts against a front side of a curved bottom surface (slidably contacting surface) 69 of the harness-guide member 56. The wire harness 54 is curved along a peripheral wall 72 of the protector 55, being extended to a holding part 73 of the vehicle body. The leaf spring 57 stands on a skew, not abutting on the wire harness 54. An anchoring part of the leaf spring 57 is fixed on the protector 55.

By opening the sliding door, the wire harness 54 is pulled forward, being contracted the diameter thereof as shown in FIG. 12. Moreover, the harness-guide member 56 is rotated downward with supporting the curved shape of the wire harness 54 against urging force of the leaf spring 57. Since the harness-guide member 56 supports the wire harness 54 with a relatively large diameter, the wire harness 54 is curved according to the curving radius of the 56 correctly without any folding, ensuring the degree of curving of the wire harness 54. Since only the harness-guide member 56 supports the wire harness 54, the degree of curving of the wire harness 54 is kept regardless of a curving angle of the leaf spring 57.

An anchoring part 75 of the wire harness 54 abuts against the anchoring part 58 of the hinge part of the harness-guide member 56, preventing the wire harness 54 from drawing further from the bottom opening 76. The anchoring part 58 acts as same as a bending regulatory wall 77, preventing the wire harness 54 from excessive bending and preventing the leaf spring 57 from excessive curving. The loop-shaped bending regulatory wall 77 regulates a maximum displacement of the leaf spring 57.

When closing the sliding door from the open condition shown in FIG. 12, the wire harness 54 slidably shifts on an upper surface 71 of the harness-guide member 56, expanding the diameter of curving of the wire harness 54 under the urging force of the leaf spring 57. Moreover, the harness-guide member 56 is restored upward as shown in FIG. 11, upholding the wire harness 54 upward with the curved shape thereof. Since the harness-guide member 56 ensures the degree of curving of the wire harness 54 constantly, the wire harness 54 is prevented from folding and there is no need to worry about any deformation or fracture of respective electric wires composing the wire harness 54 with a repetition of opening and closing the sliding door.

Furthermore, it is possible to provide a rail part (not shown) on the bottom surface 69 of the harness-guide member 56, engaging with the end part of the leaf spring 57 or the cap (slidably shifting member) 70 of the leaf spring 57 slidably. Furthermore, it is also possible to urge upward the harness-guide member 56 using a helical compression spring, a helical extension spring, a twisted spring, or so forth instead of the leaf spring 57 as a resilient member.

The devices for absorbing harness slack 1, 31, 53 as described in above respective embodiments are applicable to not only a sliding door but also other parts where a wire harness is expanded or contracted with a curved shape. Moreover, structures of above described devices for absorbing harness slack 1, 31, 53 are applicable to structures for absorbing harness slack and methods for absorbing harness slack. Moreover, it is possible to exchange the each leaf spring 4, 37 in the first and second embodiments to a stick-shaped resilient member. Moreover, it is possible to use an electric wire instead of the each wire harness 2, 32, 54.

Although the present invention has been fully described by way of examples with reference to the accompanying drawings, it is to be noted that various changes and modifications can be made in a scope of the present invention.

What is claimed is:

1. A device for absorbing harness slack comprising:
   a resilient member; and
   a harness-guide member mounted on said resilient member,
   said harness-guide member supporting slidably a portion of a wire harness curved in the longitudinal direction of the wire harness;
   whereby said harness-guide member comprise a harness-support surface curved throughout a length thereof in a direction of the curved portion of the wire harness.

2. The device for absorbing harness slack as claimed in claim 1,
   wherein said harness-support surface composes a groove curved in a circumferential direction of the wire harness.

3. A device for absorbing harness slack comprising:
   a resilient member; and
   a curved harness-guide member mounted on said resilient member rotatably,
   said curved harness-guide member supporting a curved portion of a wire harness slidably;
   whereby said curved harness-guide member is allowed to rotate in a curving direction of said wire harness.

4. A device for absorbing harness slack comprising:
   a resilient member; and
   a curved harness-guide mounted on said resilient member rotatably,
   said curved harness-guide member supporting a curved portion of a wire harness slidably;
   whereby said curved harness-guide member is allowed to rotate in a curving direction of said wire harness, wherein a coupling member intervenes between said resilient member and said harness-guide member; and said harness-guide member is coupled rotatably with said coupling member.

5. The device for absorbing harness slack as claimed in claim 4, wherein said harness-guide member comprises a harness-support surface curved throughout a length thereof in a curving direction of said curved portion.

6. A device for absorbing harness slack comprising:

a protector accommodating a wire harness in a curved shape; and a resilient member urging to absorb slack of said wire harness;

wherein a curved harness-guide member supporting said wire harness is mounted on said protector rotatably, and said resilient member urges said harness-guide member in a direct of absorbing harness slack.

7. The device for absorbing harness slack as claimed in claim 6, wherein either an end part of said resilient member or a cap at said end part thereof supports slidably said harness-guide member.

8. The device for absorbing harness slack as claimed in any of claims 3, 6 and 5, wherein said harness-guide member comprises a harness-support surface curved throughout a length thereof in a curving direction of said curved portion.

9. The device for absorbing harness slack as claimed in claim 8, wherein said harness-support surface composes a groove curved in a circumferential direction of the curved portion.

\* \* \* \* \*